Jan. 30, 1962  A. J. HAEFNER ETAL  3,019,175
MANUFACTURE OF 1,1,1-TRICHLOROETHANE
Filed Dec. 31, 1959
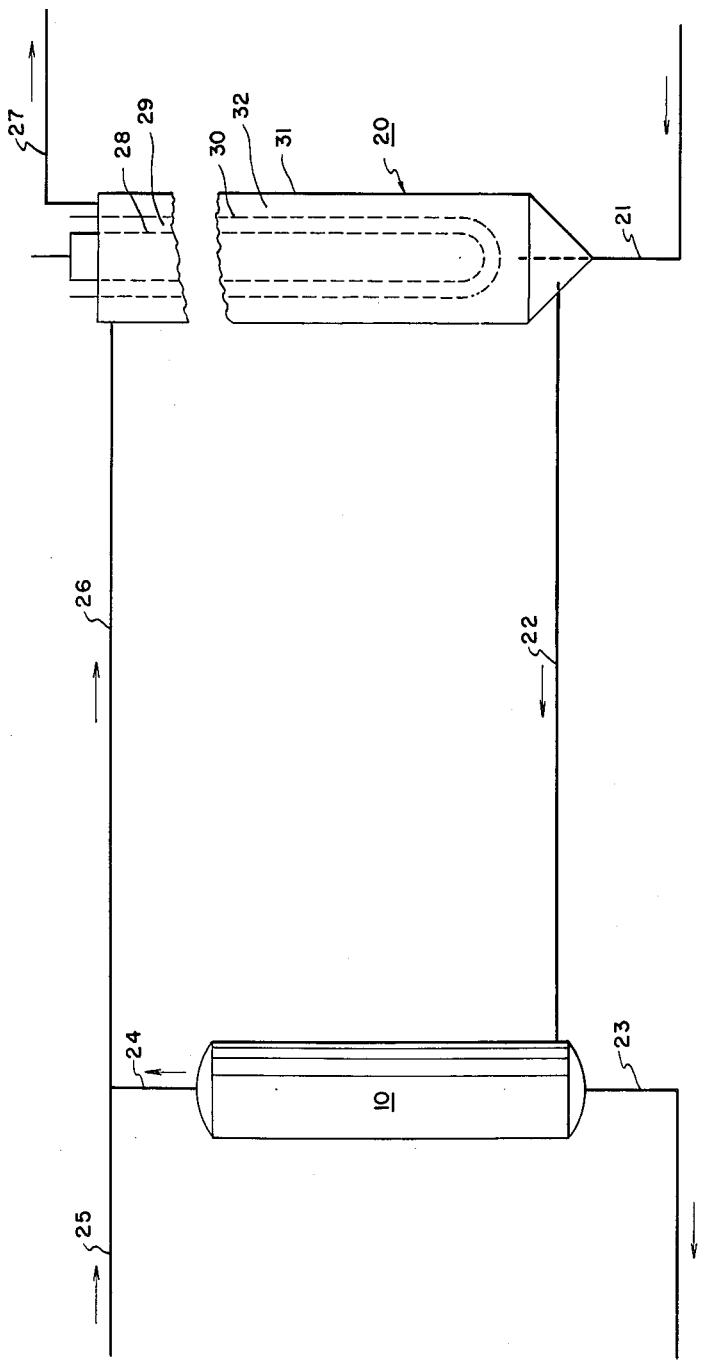

United States Patent Office 3,019,175
Patented Jan. 30, 1962

3,019,175
MANUFACTURE OF 1,1,1-TRICHLOROETHANE
Albert J. Haefner and Franklin Conrad, Baton Rouge, La., assignors to Ethyl Corporation, New York, N.Y., a corporation of Delaware
Filed Dec. 31, 1959, Ser. No. 863,180
4 Claims. (Cl. 204—163)

This invention relates to a process for the manufacture of 1,1,1-trichloroethane, particularly to a directive photochemical chlorination method for the production of this chlorinated hydrocarbon.

Prior art techniques have relied on thermal and ordinary photochemical chlorination reactions for the manufacture of methyl chloroform, or 1,1,1-trichloroethane. In all such techniques, a large amount of chlorinated by-products is concurrently produced. These competing reactions, producing in particular considerable amounts of 1,1,2-trichloroethane, have thus largely deterred commercial usage of these processes.

Accordingly, it is an object of the present invention to provide a process for the production of 1,1,1-trichloroethane from 1,1-dichloroethane wherein extremely high yields of 1,1,1-trichloroethane are obtained without the production of large amounts of 1,1,2-trichloroethane and other chlorinated products. Specifically, it is an object of the invention to provide a process for the direct photochemical chlorination of 1,1-dichloroethane without the formation of large amounts of by-products such as tetrachloroethanes and higher polychlorinated ethanes which generally predominate in chlorination reactions. It is also an object of the present invention to provide a new and contiuous process for the photochemical directive chlorination of 1,1-dichloroethane wherein increased overall efficiency and economy are realized.

These and other objects are achieved according to the present invention which comprises reacting 1,1-dichloroethane and chlorine in a directive chlorination reaction medium while maintaining the said reaction at a temperature of from about —10° C. to about 100° C. and in the presence of actinic light. Preferably the temperature is maintained at from about 20° C. to about 60° C. The reaction is generally conducted at atmospheric pressure, though positive or negative pressure can be employed.

Gaseous chlorine, liquid 1,1-dichloroethane and a liquid directive chlorination solvent are passed continuously through a photochemical chlorination zone wherein the chlorination reaction occurs. The chlorine and 1,1-dichloroethane are generally maintained at a ratio of chlorine:1,1-dichloroethane of from about 0.2 to about 2.0. Preferably the ratio of chlorine:1,1-dichloroethane is from about 0.8 to about 1.2. The directive chlorination solvent is maintained within the chlorination reaction zone in the proportions of from about 10 to about 70 percent based on the sum total weight of the 1,1-dichloroethane and the said solvent. Preferably the solvent is from about 30 to about 60 percent based on the sum total weight of the 1,1-dichloroethane and the solvent.

Quite suprisingly, it has been found that a variety of compounds have a pronounced directive chlorination effect when chlorinating 1,1-dichloroethane. Thus, by chlorinating 1,1-dichloroethane in contact with or while dissolved in such a compound or solvent, the quantity of 1,1,2-trichloroethane which is ordinarily produced in most chlorination reactions, or in a corresponding reaction in the absence of such compounds, is greatly reduced. For example, in the ordinary photochemical chlorination reaction of 1,1-dichloroethane the ratio of 1,1,1-trichloroethane:1,1,2-trichloroethane is about 3:1. When a directive chlorination compound is employed in the reaction, this ratio is greatly increased, e.g., up to about 15:1 and greater.

The photochemical chlorination reaction of 1,1-dichloroethane is carried out in the presence of a directive chlorination reaction medium—viz., a solvent or complexing agent, the presence of which alters the normal distribution of products and favors or increases the formation of the more unsymmetrical 1,1,1-trichloroethane. By the use of this directive chlorination reaction medium the chlorine complexes with, for example, a solvent molecule and creates this directive effect. The directive chlorination reaction medium, as stated, need not necessarily be a solvent but can even be an additive added to an inert liquid medium or diluent. Though the method of this invention—viz., chlorination by use of the directive chlorination reaction medium—is mentioned with reference to a photochemical chlorination which is a highly preferred embodiment, the method is also applicable to other chlorination reactions wherein catalysts other than light are employed.

Suitable directive chlorination reaction mediums include compounds selected from a group of organic compounds consisting of hydrocarbons, halogenated hydrocarbons, esters and sulfides containing up to about 20 carbon atoms, and including inorganic sulfides having up to about 2 sulfur atoms.

Suitable directive chlorination solvents for the practice of this invention include aromatic compounds, whether substituted or unsubstituted, for example, benzene, 1-chloronaphthalene, t-butyl benzene, mesitylene, o-xylene, and the like. Other solvents are compounds with conjugate unsaturation whether cyclic or acyclic, for example, cyclopentadiene and cyclopentadienyl derivatives, 1,3-butadiene, and the like; hydrocarbon sulfur compounds, ethyl sulfide, phenyl sulfide including carbon disulfide, and the like. Aliphatic hydrocarbons, whether substituted or unsubstituted, saturated or unsaturated, straight chain or branched chain, can also be employed, for example, butane, nitromethane, methyl acetate, vinyl chloride, and the like. Complexing agents which can be used include not only all of the foregoing classes of solvents, but also sulfuryl chloride, thionyl chloride, silicon tetrachloride, and the like.

A highly unique and highly preferred directive chlorination medium is a solvent consisting essentially of carbon disulfide. This is so because of the highly directive chlorination effects of carbon disulfide and because it is not chlorinated in the reaction. In addition, this particular solvent possesses many unique advantages which permit its use in a highly unique commercial operation.

The method and the manner in which the process is carried out will be more clearly understood from the following description and the accompanying schematic diagram or flow sheet which illustrates a preferred technique for carrying out this invention.

Referring to the figure, is shown a tubular type reactor 20. Within the reactor 20 is provided an annular reaction zone 32 which is formed by the inner walls 31 of the reactor 20 and the outer walls of the light well 30. Within the light well 30 is suspended a source of actinic light 28. Between the inner walls of the light well 30 and the outer walls of the source of actinic light 28 is formed an annular cooling zone 29 through which refrigerated or cooling water is circulated during the reaction.

Liquid 1,1-dichloroethane and directive chlorination solvent are passed into the reaction zone 32 through line 26. The entering liquids circulate downward and the 1,1-dichloroethane reacts with the ascending chlorine gas which is passed into the reaction zone 32 through line 21. Unreacted chlorine, and the hydrogen chloride formed during the reaction, are removed from the reaction zone 32 through line 27. The solvent, liquid and liquid reaction products, especially 1,1,1-trichloroethane and unreacted 1,1-dichloroethane, are removed from the reactor 20 through line 22 and passed into the distillation column 10. These products are taken from the reaction zone 32 at a point slightly below that wherein the chlorine gas enters the reaction zone 32. 1,1,1-trichloroethane is removed from the bottom of the reaction column 10 through line 23 and sent to storage. Unreacted 1,1-dichloroethane and the directive chlorination solvent, where lower boiling than the 1,1,1-trichloroethane, are removed from the top of the distillation column 10 through line 24 and recycled through line 26 back into the reactor 20. Make-up quantities of 1,1-dichloroethane and solvent are added to the system through line 25.

The following nonlimiting examples are illustrative of the present invention. All parts are given in weight units unless otherwise specified.

EXAMPLE I 0.12 part per hour of 1,1-dichloroethane and 0.12 part per hour of carbon disulfide solvent were passed into a reaction zone wherein the 1,1-dichloroethane was contacted with 0.21 part per hour of chlorine gas. The reaction was conducted in the presence of a 450 watt quartz mercury vapor lamp, the spectrum of which ranged from 2200 (UV) to 14,000 (infrared) angstroms and having an arch length of 4.5 inches. The temperature of the reaction was maintained at 36° C.

About 60 percent of the 1,1-dichloroethane entered into the reaction with the chlorine per pass. The reaction product was found to contain 90 percent by weight 1,1,1-trichloroethane and only about 10 percent by weight 1,1,2-trichloroethane. This corresponds to a 1,1,1-trichloroethane:1,1,2-trichloroethane ratio of 9:1. Less than 1.0 percent by weight of higher chlorinated ethanes were found in the reaction product.

The following results were in sharp contrast with the foregoing. Thus, a demonstration was conducted wherein reaction conditions were maintained the same except that the directive chlorination solvent was eliminated. 0.26 part per hour of 1,1-dichloroethane was reacted with 0.19 part per hour of chlorine gas under identical conditions except that no carbon disulfide solvent was employed in the reaction. The reaction products were found to contain 75 percent by weight 1,1,1-trichloroethane and 25 percent by weight 1,1,2-trichloroethane. This corresponded to a 1,1,1-trichloroethane:1,1,2-trichloroethane ratio of 3:1. About 5 percent by weight of higher chlorinated ethanes, etc. was found in the product.

It is thus seen that the benefits obtained by the use of the present method greatly enhances the value of the present photochemical operation. By the directive effect of the carbon disulfide solvent a drastic decrease in the weight of 1,1,2-trichloroethane has resulted. Only about 40 weight percent of the 1,1,2-trichloroethane which would normally have occurred was produced in the reaction. Only 20 weight percent as much higher chlorinated products were formed.

The following examples further demonstrate the benefits of the directive chlorination reaction. The following example shows even greater benefits than obtained in the foregoing example.

EXAMPLE II

The directive photochlorination reaction was again carried out with carbon disulfide as in the foregoing example. The quantity of directive chlorination solvent employed in the reaction was further increased. 0.12 part per hour of 1,1-dichloroethane and 0.18 part per hour of carbon disulfide was charged into a reaction zone. The solvent thus constituted 60 weight percent of the sum total of solvent and 1,1-dichloroethane. The charge was contacted with 0.10 part per hour of gaseous chlorine. In this instance the reaction was carried out at a temperature of 32° C. 0.21 part per hour of chlorinated reaction products were formed. The chlorinated products were found to contain 94 percent 1,1,1-trichloroethane and only 6 percent 1,1,2-trichloroethane. This amounts to a ratio of 1,1,1-trichloroethane:1,1,2-trichloroethane of 15:1. Only about 0.5 percent of other polychlorinated ethanes were produced.

EXAMPLES III–VI

Referring to the table below is shown the results of several other demonstrations.

The procedure of Example I is repeated in all details except for the changes shown in the table below. In these demonstrations various solvents are employed, at varying concentrations, the reaction is conducted at various reactant ratios and at varying temperatures. It has been found that lower temperatures favor a greater formation of 1,1,1-trichloroethane in relation to the 1,1,2-trichloroethane and higher chlorinated products produced. Lower temperatures are therefore preferable.

*Table*

| Example | Solvent | Percent Solvent in 1,1-Dichloro-Ethane-Solvent Feed Composition | Molar Feed Ratio, Chlorine:1,1-Dichloroethane | Temp. of Reaction, ° C. | Ratio, 1,1,1-Trichloroethane:1,1,2-Trichloroethane in Product |
|---|---|---|---|---|---|
| III | Carbon tetrachloride | 60 | 1.1:1 | 0 | 6.5:1 |
| IV | Benzene | 40 | 0.8:1 | 45 | 12.1:1 |
| V | Sulfur monochloride | 20 | 0.7:1 | 90 | 12:1 |
| VI | Phenyl sulfide | 37 | 1.4:1 | 75 | 17:1 |

EXAMPLE VII

Examples I through VI are repeated in all details except that in these instances the directive chlorination solvents employed are: methyl cyclopentadienyl, vinyl chloride, n,n-dimethylformamide, chlorobenzene, toluene, o-xylene, ethyl benzene, nitrobenzene, methoxy benzene, p-trimethylsilane, anisole, p-xylene, cumene, m-xylene, t-butyl benzene, mesitylene, iodobenzene, diphenyl ether, diphenyl, and 1-chloronaphthalene, respectively. As in the foregoing examples, the product produced in the photochlorination reaction shows an increase in the ratio of 1,1,1-trichloroethane:1,1,2-trichloroethane produced. Also, only a small fraction of other polychlorinated ethanes are produced.

Suitable directive chlorination reaction mediums include compounds selected from a group of organic compounds consisting of hydrocarbons, halogenated hydrocarbons, esters and sulfides containing up to about 20 carbon atoms, and including inorganic sulfides having up to about 2 sulfur atoms. Such compounds include aromatic compounds, whether substituted or unsubstituted, for example benzene, diphenyl, t-butyl benzene, mesitylene, o-xylene and the like; aliphatic compounds, straight chain or branch chain, saturated or unsaturated, substituted or unsubstituted, isobutane, heptane, nitrobutane, and the like; cyclic compounds, substituted or unsubstituted, cyclopentadiene, methyl cyclopentadiene, cyclohexane, and the like; halogenated hydrocarbons of any of the foregoing classes of compounds, for example, chloroprene, benzyl chloride, hexachlorobenzene, iodobenzene, 1,1,2,2-tetrachloroethane, vinyl chloride, vinylidene chloride, ethylene dibromide, 1-chloronaphthalene and the like. Compounds having conjugate unsaturation are especially preferred because of their highly directive chlorination effect. Esters suitable for the practice of this invention include aromatic and aliphatic esters such as methyl benzoate, phenyl benzoate, methyl acetate, ethyl acetate, and the like. Sulfide compounds include aliphatic and aromatic sulfides, for example, ethyl sulfide, methyl ethyl sulfide, vinyl sulfide, diisoamyl sulfide, hexynyl sulfide, dibenzyl sulfide, phenyl sulfide, and the like; and also inorganic sulfides such as sulfur monobromide, sulfur monochloride, and the like.

1,1,1-trichloroethane is useful as a solvent for the liquid and vapor phase degreasing of metals.

From the foregoing description and examples it is readily apparent that the present invention is subject to considerable variation without departing from the spirit and scope thereof.

Having described the invention, what is claimed is:

1. A process for the manufacture of 1,1,1-trichloroethane comprising reacting 1,1-dichloroethane and chlorine in a solvent selected from the group consisting of liquid aromatic hydrocarbons, liquid hydrocarbon sulfides and liquid inorganic sulfides, while maintaining the said reaction at a temperature of from about −10° C. to about 100° C. and in the presence of actinic light, and recovering a reaction product mixture having at least about a 9:1 ratio of 1,1,1-trichloroethane:1,1,2-trichloroethane.

2. A process for the manufacture of 1,1,1-trichloroethane comprising reacting 1,1-dichloroethane and chlorine, in a ratio of chlorine:1,1-dichloroethane of from about 0.2 to about 2.0, in a liquid hydrocarbon sulfide solvent, while maintaining the said reaction at a temperature of from about 20° C. to about 60° C. and in the presence of actinic light, and recovering a reaction product mixture having at least about a 9:1 ratio of 1,1,1-trichloroethane:1,1,2-trichloroethane.

3. A process for the production of 1,1,1-trichloroethane comprising reacting 1,1-dichloroethane and chlorine, in a molar ratio of chlorine:1,1-dichloroethane of from about 0.8 to about 1.2, in a carbon disulfide solvent, said solvent being maintained at about 10 to about 70 weight percent of that of the sum total weight of the reaction solvent and the 1,1-dichloroethane, while maintaining said directive chlorinating solvent at a temperature of from about 20° C. to about 60° C. and in the presence of actinic light, and recovering a reaction product mixture having at least about a 9:1 ratio of 1,1,1-trichloroethane:1,1,2-trichloroethane.

4. A process for the production of 1,1,1-trichloroethane comprising reacting 1,1-dichloroethane and chlorine, in a molar ratio of chlorine:1,1-dichloroethane of from about 0.8 to about 1.2, in carbon disulfide solvent, said solvent being maintained at about 10 to about 70 weight percent of that of the sum total weight of the solvent and the 1,1-dichloroethane while maintaining said solvent at a temperature of from about 20° C. to about 50° C., in the presence of actinic light, and recovering a reaction product mixture having at least about a 9:1 ratio of 1,1,1-trichloroethane:1,1,2-trichloroethane.

References Cited in the file of this patent
UNITED STATES PATENTS
2,861,032     Scherer _____ Nov. 18, 1958